United States Patent [19]

Wahls

[11] Patent Number: 5,112,018
[45] Date of Patent: May 12, 1992

[54] VEHICLE SEAT TRACK APPARATUS

[75] Inventor: Robert J. Wahls, Pickney, Mich.

[73] Assignee: ITT Corporation, New York, N.Y.

[21] Appl. No.: 740,822

[22] Filed: Aug. 5, 1991

[51] Int. Cl.$^5$ .............................................. F16M 13/00
[52] U.S. Cl. ................................... 248/394; 248/419; 248/421; 297/339
[58] Field of Search ...................... 248/394, 421-423, 248/396, 398; 297/345, 347, 330, 337, 338, 361, 339

[56] References Cited

U.S. PATENT DOCUMENTS

| | | |
|---|---|---|
| 2,924,265 | 2/1960 | Himka . |
| 4,015,812 | 4/1977 | Heesch . |
| 4,422,611 | 12/1983 | Kitsuda ............................ 248/394 |
| 4,432,583 | 2/1984 | Russo . |
| 4,648,578 | 3/1987 | Sakamoto ........................ 248/396 |
| 4,986,509 | 1/1991 | Suzuki ............................ 248/396 |
| 4,995,580 | 2/1991 | Fujii ................................ 248/421 |
| 5,014,958 | 5/1991 | Harney ............................ 248/394 |

Primary Examiner—Reinaldo P. Machado
Attorney, Agent, or Firm—Robert P. Seitter; J. Gordon Lewis

[57] ABSTRACT

A power seat track apparatus for selectively positioning an automotive vehicle seat is adapted to be powered by an electric motor drive, preferably with separate motors for each drive direction. The seat back is mounted on the upper track of the seat track mechanism for horizontal drive with the track. The vertical drive through front and rear torsion tubes or bars act on only the seat pan and seat cushion but not on the seat back. Since the vehicle shock loading requirements must be met by the structural seat pan or seat frame, the pan for holding only the seat cushion may be reduced in size as compared to the usual power seat frame. The front of the seat cushion is interconnected with the pan through a lost motion pivot and the rear portion of the seat cushion is interconnected with the seat pan through a fixed pivot connection whereby simultaneous elevation and shortening of the seat cushion with respect to the seat back is effected.

8 Claims, 4 Drawing Sheets

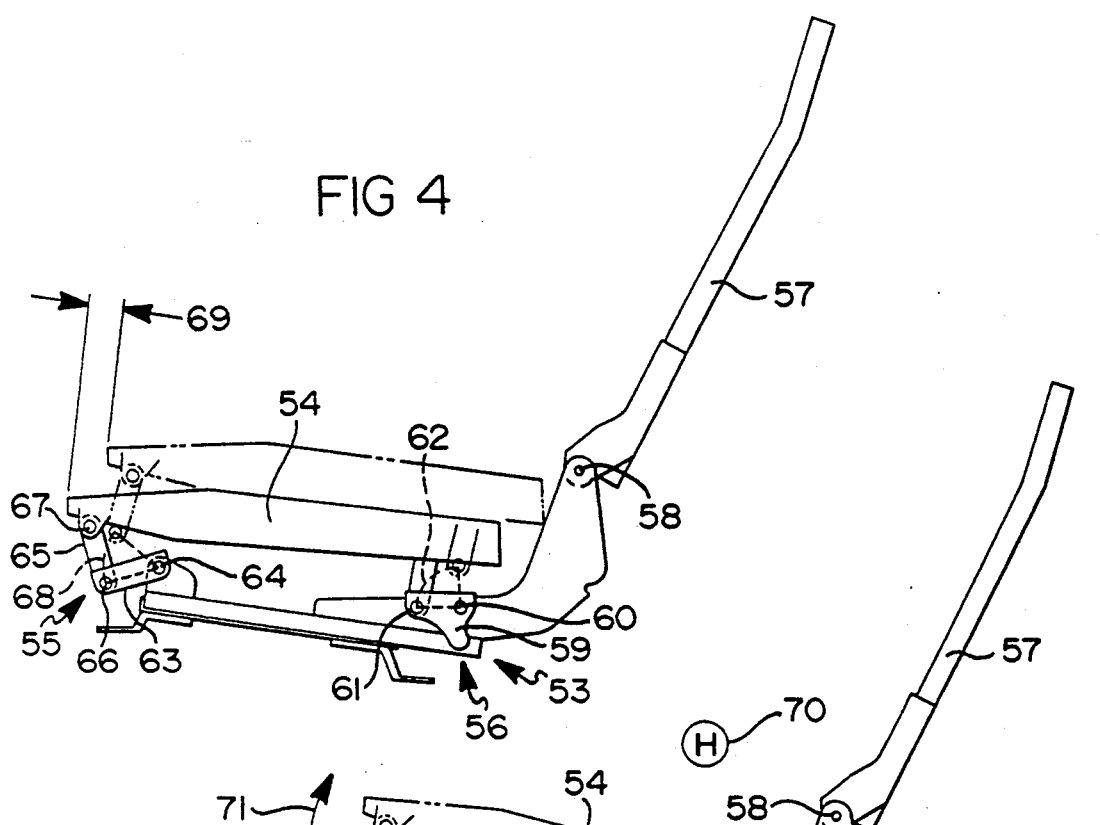
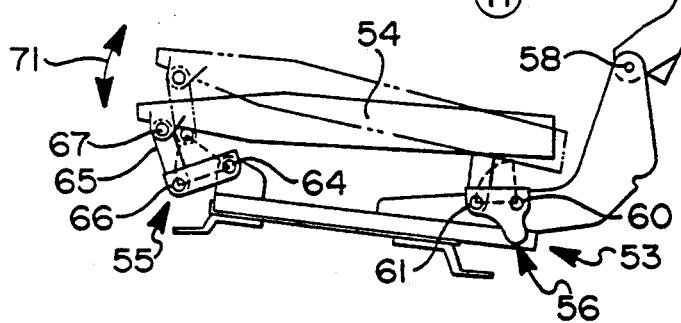
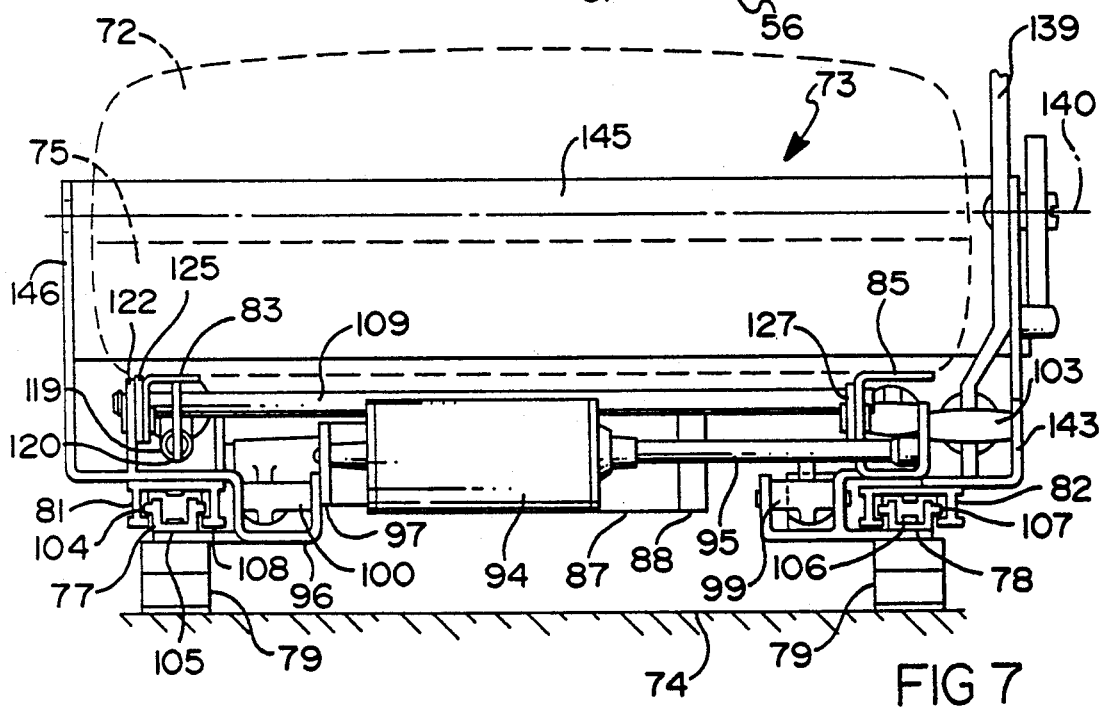

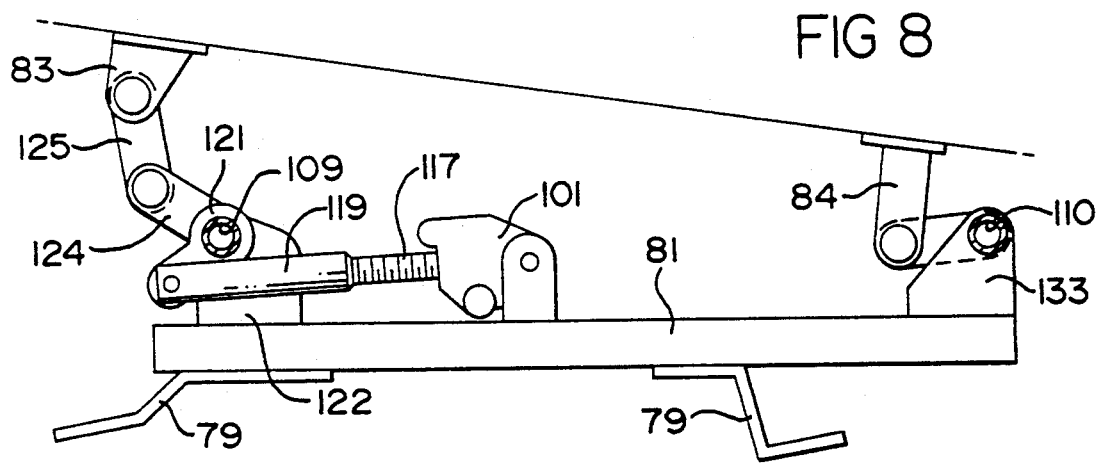
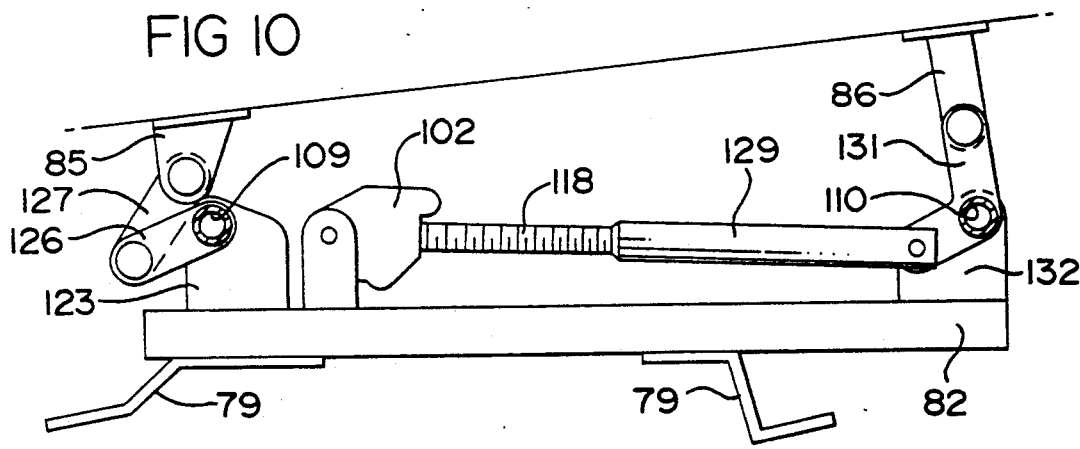
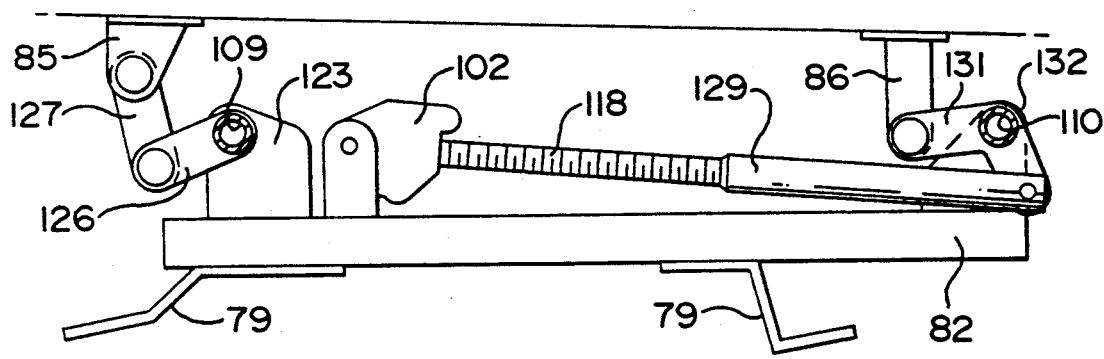

VEHICLE SEAT TRACK APPARATUS

INTRODUCTION

The present invention relates to mechanisms for supporting and positioning seat assemblies and more particularly to split-frame power seat track mechanisms for supporting and positioning seat assemblies within motor vehicles.

CROSS-REFERENCE

The subject matter of the invention is related to that of U.S. Pat. No. 4,432,583 entitled Vehicle Seat Track Apparatus.

BACKGROUND OF THE INVENTION

Apparatus for powered seat track adjustment or position setting of automobile seats are extremely well known in the art. In most such track mechanisms, a unitary seat pan or seat cushion frame is mounted on the upper seat track for fore and aft movement under the control of a horizontal drive and for vertical movement of the forward and rear ends of the seat by operation of respective drives, one for each seat end. A unitary seat pan includes the seat frame and seat cushion and back frame and back cushion. Thus, any movement of the seat frame and cushion causes slight movement of both the back frame and back cushion and looseness in construction leads to a "chucking" condition prevalent in such mechanisms.

In U.S Pat. No. 2,924,265 issued Feb. 9, 1960, the seat back is separated from the seat frame to prevent vertical movement of the seat back while the seat frame and back are coupled together for horizontal motion. Such a design is commonly referred to as a "split-frame" seat track. In this apparatus a single motor is used with solenoids acuatable to clutch the selected drive to the motor to drive the seat frame and seat back in a fore and aft direction and to drive the seat frame front and rear ends in a vertical direction. No additional seat back movement is disclosed by this reference.

U.S. Pat. No. 4,432,583 issued Feb. 21, 1984 describes a seat track mechanism of generally conventional type having parallel seat tracks establishing the laterl sides of the mechanism. The mechanism provides four types of seat motion: vertical movement of the front edge of the seat, vertical movement of the rear edge of the seat, horizontal transitory movement of the seat and seat back, and pivotal motion of the seat back. These movements are all generated by lead screw mechanisms individually driven by drives such as motor drives of any generally known conventional type.

Both vertical movements of the seat frame and cushion are produced by separate lead screws by motor driven individual worm gears. Each lead screw travels within a threaded tubular member, the member being pivotally secured to one end of a link, the other end of the link being secured to a torsion bar rotated responsive to lead screw movement. A pivot arm on the torsion bar translates the rotary motion of the bar to move the seat support accordingly.

The seat track apparatus ofthe '583 patent includes a pivot connection provided between a front link and the seat frame and a sliding pivot or lost motion connection is provided between the rear link and the rear portion of the seat frame such that when the front of the seat pan is raised, the seat pan front moves in an arc toward the rear. Such movement results in the occupant of the seat having the lumbar region of his back pressed into the seat back.

Many prior art power seat tracks have an undesirable side effect in that tilting of the seat cushion causes a vertical adjustment of the rear portion of the seat cushion and thus displacement of the occupant theoretical hip point ("H" point). Each movement of the H point thus alters the postional relationship between the operator's eyes and the vehicle's mirrors, instruments and the like. Having to readjust mirrors with each actuation of the "tilt" control of the power seat is deemed undesirable A further disadvantage of many prior art designs resides in the seat cushion having a substantially fixed longitudinal positional relationship with the seat back. Thus, shorter drivers could raise the seat cushion but could not in any way alter the horizontal position of the seat with respect to the seat back to increase occupant comfort inasmuch as typical seat cushion lengths are selected as a compromise between average sized occupants and those falling in the 95th height percentile.

BRIEF DESCRIPTION OF THE INVENTION

The present invention provides a seat track mechanism of generally conventional type having parallel seat tracks establishing the lateral sides of the mechanism. The mechanism produces four types of seat motion; vertical movement of the front edge of the seat, verical movement of the rear edge of the seat, horizontal translatory movement of the seat and seat back, and pivotal motion of the seat back. These movements are all generated by lead screw mechanisms individually driven by drives such as motor drives of any generally known conventional type.

In the broadest sense, the present convention provides a split-frame power seat track mechanism for supporting and positioning the seat assembly of the type including a seat cushion and a seat back within a motor vehicle. The inventive mechanism includes laterally spaced rail members, a carriage carried by the rail members for controlled longitudinal displacement, the seat assembly being disposed upon the carriage, and means which interconnect the carriage and the seat cushion to effect limited relative motion therebetween in response to an operator input, the motion comprising simultaneous vertical and longitudinal translation of the seat cushion between a fully extended, lowermost end limit of travel and a fully retracted, uppermost end limit of travel. This arrangement provides the advantage of simultaneously adjusting the cushion length shorter as it is raised.

According to a preferred embodiment of the invention, the seat cushion is interconnected with a carriage through a front, lost motion pivot connection disposed intermediate a front edge of the seat cushion and a front underlying portion of the carriage and a rear, fixed pivot connection disposed intermediate a rear edge of the seat cushion and a rear underlying portion of the carriage. First drive means operate to selectively longitudinally position the carriage in response to a first operator input. Second drive means are provided engaging the front pivot connection which are operative to selectively vertically position the front end of the seat cushion in response to a second operator input and, third drive means are provided which engage the rear pivot connection operative to selectively vertically displace the rear edge of the seat cushion in response to a third operator input between a fully raised and lowered end limits of travel and to simultaneously longitudinally displace the seat cushion with respect to the carriage between fully retracted and extended end limits of travel. This arrangement has the advantage of permitting front cushion height adjustment without materially changing the effective cushion length.

According to another aspect of the invention, the rear pivot connection is located substantially below a characteristic design H point of said seat assembly. This arrangement has the advantage of allowing tilt or front cushions height adjustment without changing effective cushion length or sitting height of the occupant.

According to still another aspect of the present inventin, the pivot connections each comprise in an elongated link member pivotally connected at spaced points thereon to said carriage and said seat cushion wherein an imaginary line drawn said spaced points for each said link is disposed generally horizontally when said seat cushion is in said fully lowered position and offset from horizontal by an acute angle when said seat cushion is in said fully raised end limit. This arrangement has the advantage of maximizing the horizontal displacement or shortening of the seat cushion with respect to the seat back.

These and other features and advantages of this invention will become apparent upon reading the following specification, which, along with the drawings, describes and discloses preferred and alternative embodiments of the invention in detail.

A detailed description of the disclosed embodiments makes reference to the accompanying drawings.

BRIEF DESCRIPTION OF THE DRAWINGS

FIG. 4 is a side view in evaluation of one embodiment of a seat frame assembly embodying the present invention illustrating a first seat extended motion pattern;

FIG. 5 is a side view in evaluation of the seat frame assembly of FIG. 4 illustrating a second extended motion pattern;

FIG. 7 is an and view of the assembly of FIG. 6, viewed from the front (left) thereof in the full down position;

FIGS. 8 and 9 are sectional views taken along line VIII—VIII of FIG. 6 with FIG. 8 showing the full up position and FIG. 9 the full down position; and FIGS. 10 and 11 are sectional views taken along line X—X of FIG. 6 with FIG. 10 showing the full up position and FIG. 11 showing the fold down position.

DETAILED DESCRIPTION OF THE PREFERRED AND ALTERNATIVE EMBODIMENTS OF THE INVENTION

Figure 1:
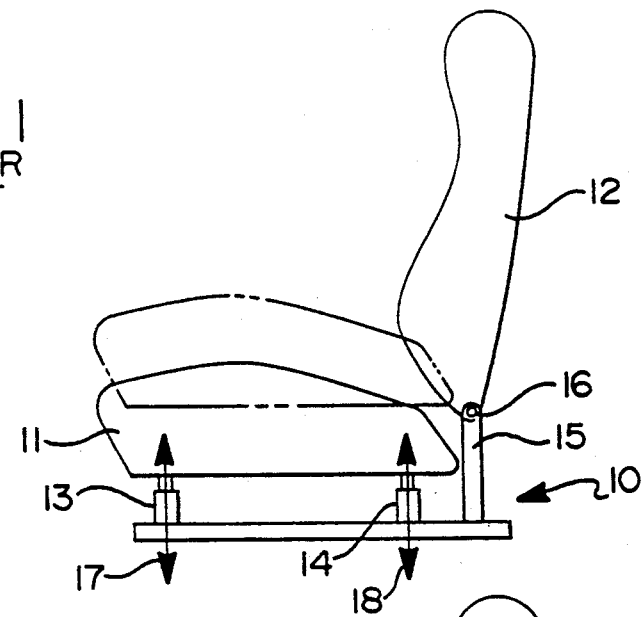
FIG. 1 is a side schematic view in evaluation of a prior art seat mechanism.

Referring to FIG. 1, one form of prior art seat track mechanism 10 is illustrated in largely schematic form. Mechanism 10 supports a seat assembly comprising a seat cushion 11 and a seat back 12 carried by mechanism 10 for fore and aft longitudinal adjustment therewith. Mechanism 10 includes rails (not illustrated) rigidly mounted on a host vehicle which permits the entire assembly illustrated in FIG. 1 to be selectively adjusted longitudinally. Seat cushion 11 is affixed to mechanism 10 by front the rear vertically directed linear actuators 13 and 14. Seat back 12 is affixed to a rigid member 15 extending from mechanism 10 through a laterally extending horizontal hinge point 16 in the usal manner. As illustrated, seat cushion 11 and seat back 12 are fixed for longitudinal movement with mechanism 10. A controller (not illustrated) for actuators 13 and 14 allows independent vertical adjustment thereof as illustrated by arrows 17 and 18. Thus, the seat cushion 11 of FIG. 1 can be vertically adjusted independently of seat back 12 and tilted with respect thereto by coordinated actuation of linear actuators 13 and 14.

Figure 2:
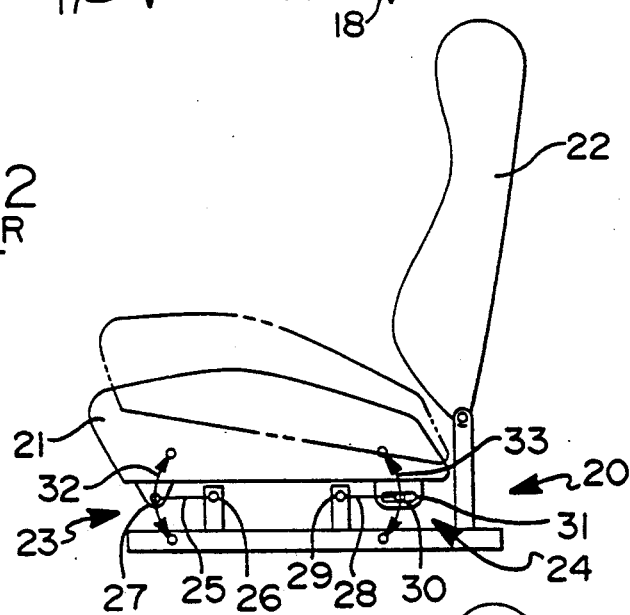
FIG. 2 is a schematic side view in evaluation of a second prior art seat mechanism.

Referring to FIG. 2, an alternative prior art power seat track mechanism 20 is illustrated which supports a seat cushion 21 and seat beak 22. The front edge of seat cushion 21 is interconnected with mechanism 20 through a front pivot connection 23. Likewise, the rear edge of seat cushion 21 is interconnected with mechanism 20 through a rear pivot connection 24. Front pivot connection 23 is of the fixed type which, definitionally for the purposes of this specification, includes a single elongated link pivotally interconnected at one point 26 thereof to mechanism 20 and at a another point 27 thereof to the front part of seat cushion 21, and functional equivalents thereof. Rear pivot connection 24 is of the lost motion type which definitionally for the purposes of this specification, includes an elongated link 28 which is pivotally fixed to mechanism 20 at a point 29 and pivotally engages seat cushion 21 at another point 30 through either a horizontally directed slot 31 defined by seat cushion 21 or, alternatively, a sliding pivot as will be described hereinbelow with reference to FIGS. 4 through 11, as well as functionl equivalents thereof. As shown in FIG. 2, links 25 and 28, are antiparallel, that is, they extend in opposite directions from their point of interconnection with mechanism 20. Links 25 and 28 are operatively connected to rotary actuators (not illustrated) which are independently actutable through limited paths of travel indicated by arcuate arrows 32 and 33, respectively, to effect vertical positioning of seat cushion 21 with respect to mechanism 20 as well as tilt control of seat mechanism 21 with respect to seat back 22. Because the excursions of links 25 and 28 above the below their illustrated positions are essentially vertical, the longitudinal orientation of seat cushion 21 remains relatively fixed with respect to seat back 22 and very little longitudinal displacement of seat cushion 21 takes place. Furthermore, in a tilt mode of operation, when pivot connection 23 is being rotated to raise the front edge of seat cushion 21, seat cushion 21 will inherently be displaced rearwardly, which may be undersirable in some operational modes.

Figure 3:
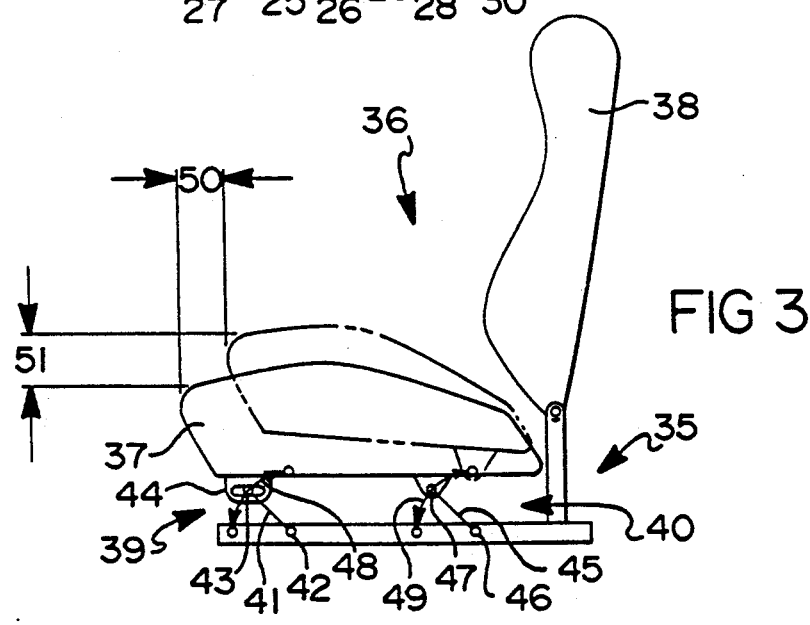
FIG. 3 is a schematic side view in evaluation of a seat mechanism embodying the present invention.

Referring to FIG. 3, a schematically illustrated power seat track mechanism 35 embodies the present invention and supports a seat assembly shown generally at 36 thereon. Seat assembly 36 includes a seat cushion 37 and a seat back 38. Seat cushion 37 is interconnected with mechanism 35 through a front pivot connection 39 and a rear pivot connection 40. Front pivot connection 39 is of the lost motion type and includes an alongated link 41 pivotally connected at one point 42 to mechansim 35 and at another point 43 to the front edge of seat cushion 37 through a lost motion slot 44. Rear pivot connection 40, is of the fixed type and includes an elongated link 45 pivotally connected to mechanism 35 at one point 46 and pivotally connected to seat cushion 37 at another point 47. As in the case of the prior art mechanism 20 described with reference to FIG. 2, pivot connections 39 and 40 are operatively driven by independent rotary actuators as will be described in detail hereinbelow for independent displacement between limits of travel as indicated by arcuate arrows 48 and 49, respectively. As will be described in detail hereinbelow in the context of a preferred embodiment of the invention, the present invention has two distinct advantages over the prior art device described in FIG. 2 hereinabove. First, in the tilt mode when rear pivot connection 40 is stationary and front pivot connection 39 is being actuated, seat cushion 37 will pivot about an axis defined by point 47, preventing seat cushion 37 from longitudinal displacement. Furthermore, configuration of links 41 and 45 in aligned horizontal configuration when seat cushion 37 is in the full downward position, results in a greatly enhanced shortening of seat cushion 37 with respect to seat back 38. Such shortening takes place simultaneously with elevation of seat cushion 37 through its range of travel to its uppermost limit of travel. The shortening of seat cushion 37 as indicated by arrows 50 has been found to be approximately three times of that achieved in prior art designs. Note that the vertical displacement of seat cushion 37 indicated by arrow 51 represents the translation from the middle of its range of movement to its uppermost end limit of movement. Thus, the total range of movement of seat cushion 37 is twice that indicated by horizontal arrows 50 and vertical arrows 51.

Referring FIGS. 4 and 5, an alternative embodiment of the present invention is illustrated. A power seat track mechanism 53 has a seat cushion pan or frame mounted thereon through interconnecting front and rear pivot connections 55 and 56, respectively. A seat back frame 57 is rigidly mounted to mechanism 53 through a hinge joint 58. Rear pivot connection 56 includes a link 59 which is pivotally connected to mechanism 53 at one point 60 and pivotally connected to seat frame 54 at a second point 61. Pivot connection 56 operates precisely as that described in relation to rear pivot connection 40 in regards to FIG. 3 between limits of travel as indicted by dotted line 62. Front pivot connection 55 is of the lost motion type and includes a primary link 63 which is pivotally attached to mechanism 53 at one point 64 and pivotally connected to a secondary link 65 at a point 66. Secondary link 65 is pivotally connected to frame 54 at a third point 67. As will be described in detail in hereinbelow, vertical positioning of seat frame 54 will be effected as illustrated in FIG. 4, by simultaneous actuation of front and rear actuators (not illustrated) which rotationally reposition links 59 and 63 from their illustrated position along dotted lines 62 and 68, respectively to effect vertical repositioning from a lower limit of travel illustrated in solid line to an uppermost limit of travel illustrated in dotted line and, simultaneously, shortening seat frame 54 with respect to back frame 57 by simultaneously longitudinally displacing seat frame 54 from its forwardmost or extended position illustrated in solid line to is retracted or rearwardmost position illustrated in dotted line, thereby effecting substantial shortening of the seat frame 54 as indicated by arrows 69 as discussed hereinabove.

Referring to FIG. 5, the theoretical hip point ("H" point) for an occupant is designated at 70. In the preferred embodiment of the invention, rear pivot connection 56 is disposed substantially directly below H point 70 whereby upon tilting of seat frame 54 by actuation of front pivot connection 55, frame 54 will rotate about an axis point almost directly below the H point. As a result, the occupant's H point, and thus the upper part of occupant's torso, will not move, eliminating the need for readjustment of visual alignment with mirrors, instruments and the like. As indicated by arcuate arrow 71, tilting of seat frame 54 extends from a lower limit of travel indicated in solid line to an upper limit of travel indicated in dotted line.

Referring to FIGS. 6 through 11, the preferred embodiment of the present invention is illustrated in detail. It should be noted that a substantial portion of the structure of the preferred embodiment of the invention is derived from the embodiment described in prior U.S. Pat. No. 4,432,583. Accordingly, for the sake of brevity, detail of operation of aspects of the preferred embodiment of the present invention not germane thereto will not be described in detail, it being understood that the reader may consult with the '583 patent. Lastly, U.S. Pat. No. 4,432,583 is hereby expressly incorporated by reference, it being understood that operation of the device described in the '583 patent is substantially as described herein unless stated otherwise.

FIGS. 6 through 11 show an adjustable seat mechanism 73 for a seat structure mounted with respect to the floor of an automobile as shown by solid line 74 (see FIG. 7).

The seat structure includes rigid seat pan or seat frame 75 which may be of metal or molded plastic. The pan or seat frame 75 supports the seat cushion 72 and is secured to an upper portion of the seat track mechanism 73 of the type generally shown by U.S. Pat. No. 4,015,812 issued Apr. 15, 1977 to Heesch. The pan or frame 75 and its mounting provides the structural strength and rigidity to enable the mechanism to withstand shock loading.

The mounting engagement between the upper seat track and the seat frame 75 allows selective vertical movement of the seat frame under the control of a conventional control button arraignment (not shown). The upper seat track is also capable of fore and aft movement under selective control. A seat back (not illustrated) is secured to the upper seat track for fore and aft movement with the seat track by means of a rigid bracket.

Mechanism 10 has two transversally spaced generally U-shaped structural mounting base rails 77 and 78 (FIG. 7) each of which is suitably fixed by bolts or the like to front and rear respective beams or brackets 79, the beams being secured permanently to the floor 74 of the vehicle. The two base rails 78 and 77 are parallel to one another and are spaced a lateral distance from one another to receive and form the stationary support for a vehicle seat on the two rails.

The major structural elements of mechanism 73 are the respective stationary mounting base rails 77 and 78, and a carriage 80 longitudinally translatable along the rails. The carriage is generally composed of two spaced apart upper seat tracks 81 and 82, each upper track being engaged with a like base rail 77 and 78 in a track relationship allowing horizontal front to rear movement of the upper tracks. Seat securing brackets 83 through 86 rest above the tracks of the mechanism and are coupled to the ends of the seat pan or frame 75. The front brackets 83 and 85 are pivoted jointly to raise the front end of the seat frame, the rear brackets 84 and 86 are pivoted jointly to raise the rear seat end. The brackets 83 through 86 support the seat pan 75 to raise and lower the seat ends accordingly. Controlled drive, translatory motion of the carriage 80 in response to selection by control devices (not shown) produces longitudinal movement of the seat track in a fore and aft sense. Other controls (not shown) produce selective vertical movement of either the front or the rear end of the seat securing brackets 83 through 86 and consequent movement of the front and/or rear end of the seat, respectively.

Figure 6:
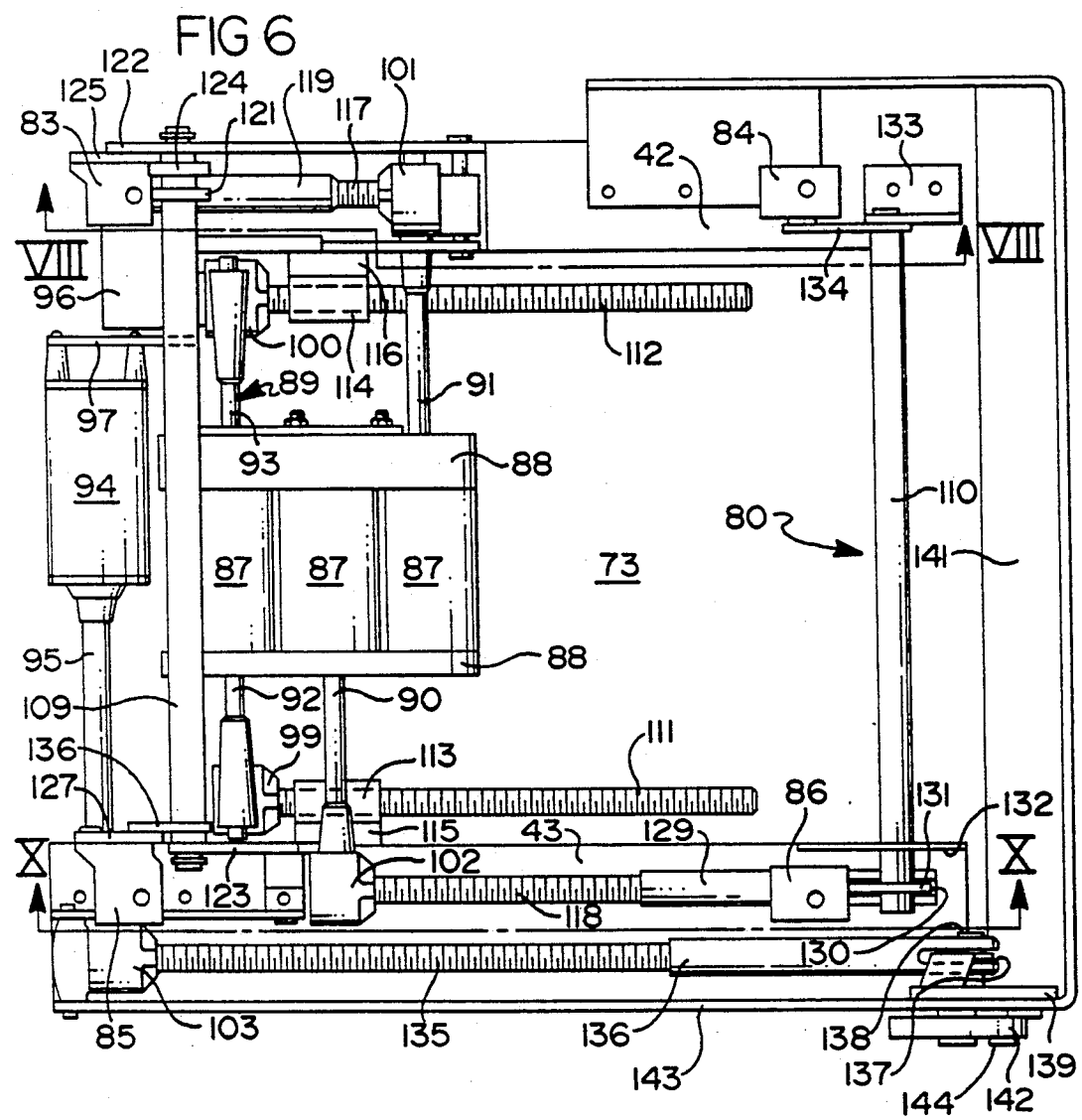
FIG. 6 is a view of the preferred embodiment of a seat frame assembly viewed from the top thereof.
Figure 9:
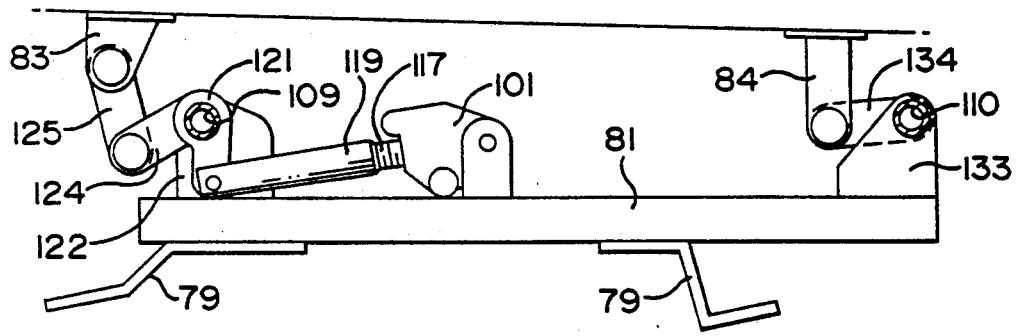

As best seen in FIG. 6, a drive for the mechanism using four, single-armature motors 87 of a type well-known in the art. Some of the motors (3, as shown) have a common rigid housing or casing 88 with suitable end bell structure enclosing respective output drive shafts 89, 90 and 91, for the fore and aft drive, front vertical drive and rear vertical drive, respectively. Shaft 89 has a portion 92 extending from one end and a portion 93 extending from the other end thereof. A separate motor 94 is used to drive an output shaft 95 for seat back movement. The four motors, i.e. motor 94 and the three motors 87 in common housing 88, are supported intermediately in the mechanism 73 between the mounting base rails and are supported on the upper tracks for movement therewith through suitable mounting platform 96 carrying brackets 97. Suitable other motor-control drives such as a single motor with four individually selectable clutch drive shafts or four separate motors mounted (in parallel with one another) could also be used. In any event, there would be an output shaft from each motor-control drive. The four output shafts 89, 90, 91 and 95 of the motor drives are connected to respective driven assemblies in a known manner. Each motor is adapted to receive a separate operator input from a control circuit or switch. Additionally, a single operator input can simultaneously, logically energize one or more motors to effect various known seat operating modes.

The motor drive output armature or shafts 89, 90, 91 and 95 are each engaged to and rotate an internal drive within an enclosing flexible tube, the cable and tube being of known design (the cable within the tube herein being generally called a shaft). The internal cable for each shaft may in any conventional manner rotate a suitable drive gear (not shown) within the enclosing socket e.g., 98 for a respective gear box. Each gear box may be of the type known in U.S. Pat. No. 3,951,004 to Heesch issued Apr. 20, 1976. Five such gear boxes or transmissions are provided, all mounted on the upper track or carriage. Two boxes 99 and 100 are provided, one on each lateral side of the mechanism shown in FIG. 6, are driven by the horizontal shaft portions 92 and 93 at each lateral end of the motor. The gear boxes of the drive assemblies of FIG. 6, (viewed from the front) are called the left track horizontal gear box 100, right track horizontal gear box 99, front vertical gear box 101, rear vertical gear box 102, and seat back gear box 103 herein are essentially identical in internal construction and operation. The engagement of each shaft cable with the driven shaft within the socket of the gear box controls the rotation of gearing (not shown) within the gear box to product output rotation of a lead screw responsive to rotation of the respective motor driven shaft.

As best seen in FIG. 7, each stationary mounting base rail 77 and 78 of the apparatus is a unitary, rigid structure member having a generally U-shaped cross section with stepped outwardly directed flanges 104. The web 105 of the base rail is supported on the mounting brackets 79 at both the front and the rear. Suitable apertures or mounting holes (not shown) in the brackets 79 allow the base rails 77 and 78 to be mounted to suitable floor support structure of the vehicle.

The sides 106 of the U-shape of the mounting base rail (shown best in FIG. 7) are parallel and terminate in outwardly facing horizontal flange members 104. Suitable plastic guides 107 are provided with longitudinal slots for slidably receiving these flange members to provide a sliding relationship between flange members 104 of the rails 77 and 78, and the inwardly extending channel slide track members 108 of upper seat tracks 76 within which these guides are tracked. The track members 108 essentially comprise a unitary beam in an inverted U-shaped form, with inwardly disposed channel flanges supporting the plastic slide guides.

As best seen in the plan view of FIG. 6, the carriage 80 includes the motor drive structure mounted on the two transversely spaced-apart slide tracks 81, 82 and movable jointly relative to the stationary rails 77 and 78 in the fore and aft or front to rear sense. The carriage structure further includes a transverse platform structure 96 including bracket 97 affixing the motors midway between the tracks 81 and 82. A front torsion bar 109 and a rear torsion bar 110 are each laterally disposed at respective ends of the tracks 81 and 82. The torsion bars are each mounted to the tracks 81 and 82 to span the space between the tracks at the respective front and rear of the carriage and brace the structure. Pivotally linked to the torsion bars are seat securing brackets 83 though 86 which are positioned above the respective tracks.

The sliding upper tracks 81 and 82 also act as the mounting support for platforms for the gear boxes 99 and 100 controlling horizontal drive. The upper seat tracks 81 and 82 support gear box 98 for the seat back and rear and front vertical seat drives 101 and 102. As best seen in FIG. 6, the fore and aft drive shafts 89 are generally coaxial, each coupled with respective gear boxes 99 and 100 to rotate output screws 111 and 112 for the fore and aft drive. Screws 111 and 112 are cantilevered rearwardly from their driven coupling in the respective gear boxes 99 and 100.

Each of the horizontal drive screws 111 and 112 are threaded within respective drive blocks or nuts 113 and 114, the drive block being secured to the lower stationary rails 77 and 78. Thus, the blocks 113 and 114 are stationary and the lead screws are advanced or retracted on operation of the fore and aft motor 87 and shafts 89. Each drive block 113 and 114 has a fore and aft threaded tube with a horizontally extending integral cover bracket 115 and 116, respectively. The cover bracket is secured to the lower stationary rails so that on rotation of the fore and aft motor, both shafts are rotated to advance or retract relative to the drive blocks 113 and 114 and move the upper tracks and carriage 80 accordingly. The upper tracks slide relatively to the lower stationary rails through the medium of the plastic guides, as mentioned hereinabove.

The vertical drive is implemented through shaft 91 for the front end of the seat and shaft 90 for the rear end of the seat. Each shaft 91 and 90 has a gear box or gear housing 101 and 102 coupled to it for causing rotation of respective lead screws 117 and 118.

The front drive gear box 101 has extending in a forward direction therefrom the drive screw 117. Drive screw 117 is rotated responsive to rotation drive shaft 91 in a know fashion. An internally threaded tube or nut 119 receives the free end of drive screw 117. As best shown in FIG. 7, the front end of tube 119 has a central axial slot 120. Slot 120 provides a clearance opening within which there is a disposed link 121 pivotally connected to 120. Link 121 includes a second aperture in its middle through which torsion bar link fixed to torsion bar 109 by welding or the like. Torsion bar 109 is pivotally connected at one end to bracket 122 which, in turn is fixedly mounted to upper seat track 81. Torsion bar 109 is fixedly pivotally connected at its other end to a bracket 123 which it in turn, is fixedly mounted to upper seat track 82. As shown in FIGS. 6 through 11, a lever 124 is attached to one end of the torsion bar 109 adjacent link 121. The upper end of lever 124 is pivotally connected to an end of a second lever 125. The remaining end of lever 125 is pivotally connected to bracket 83. A set of slave levers 126 and 127 interlink front torsion bar 109 and seat securing bracket 85 configured as levers 124 and 125 described hereinabove. Slave lever 126 is firmly attached to the opposite end of the torsion bar 109 and is pivotally connected to lever 127 which, in turn, is pivotally connected to seat bracket 85.

The rear drive gear box 102 has extending rearwardly therefrom a drive screw 118. This drive screw 118 is rotated responsive to rotation of motor shaft 90 in known fashion. An internally threaded tube or nut 129 receive the free end of lead screw 118, and is advanced or retracted in response to rotation of the lead or drive screw 118. At its rearward end, tube 129 has a central axial slot 130. Slot 130 provides a clearance opening in which there is pivotally fitted a link 131, the link being pinned pivotally diametrically to the tube 129 at a pin. Link 131 is mounted pivotally so that the lower end of the link is advanced or retracted responsive to rotation of the lead screw. At its modpoint, link 131 is firmly affixed as by welding or the like, to rear torsion bar 110. Rear torsion bar 110 is pivotally connected at one end to upper seat track 82 through a bracket 132 and at its other end to upper seat bracket 81 through a bracket 133 the upper end of link 131 is pivotally connected to seat securing bracket 86. The opposite end of rear torsion bar 110 is rigidly affixed with one end of a slave link 134. The other end of slave link 134 is pivotally connected to seat securing bracket 84. Thus, on rotation of the lead screw 118, link 131 is rotated with torsion bar 110. The operation of torsion bars is described in U.S. Pat. No. 4,015,812 issued Apr. 5, 1977.

Double links 124–125, and 126–127 which interconnect the seat pan with carriage 80 provides a lost motion type pivot connection. Such lost motion connections is provided at only the front of the seat and not at the rear. By this arrangement, rotary motion of links 121 and 126 is translated into essentially vertical motion by the front portion of the seat pan 75 and seat cushion 72. By providing a lost motion connection at the front of the seat pan 75 and by providing a fixed type pivot connection at the rear of seat pan 75, an advantage effect is obtained. More specifically, as the seat front is raised, the operators H point is not effected. Movement of the seat back is controlled by motor 94. Motor 94 is affixed to motor structure 88 by bracket 97 for movement with carriage 80 in a fore and aft sense. Motor 94 in operation rotates shaft 95 to gear box 103. Gear box 103 is mounted on the upper seat track externally and independently of any connection to the elevating brackets 83 through 86. Rotation of shaft 95 causes rotation of a lead screw 135. The lead screw 135 is threaded and mates with an internally threaded tubular sleeve 136. Sleeve 136 has a bifurcation in its end remote from motor 94 and is pivotally pinned 138 to the lower end of a pivot arm 139. The upper end of pivot arm 139 is secured to the seat above the pivot axis 140 of the seat, the seat back being pivotally secured to the back support structure 141 at pivot axis 140. Mounted on the pivot axis 140 is a coiled torsion spring 142 which functions as an assist spring. the spring outer end being affixed to a side bracket 143 as by a clip 144. The seat back support 141 comprises a lateral bracing bar 145 extending across the entire seat back and integrally forming downwardly angled brackets 143 and 146. The brackets 143 and 146 are secured on the upper seat tracks 81 and 82, respectively as shown in FIG. 7.

It is to be understood that the invention has been described with reference to a specific embodiment and variation to provide the features and advantages previously described and that such embodiment is susceptible of modification as will be apparent to those skilled in the art. For example, one or more linear actuators with a line of action offset from vertical could be employed to effect simultaneous raising and shortening of the seat cushion. Accordingly, the foregoing is not to be construed in a limiting sense.

What is claimed is:

1. A split-frame power seat track mechanism for supporting and positioning a seat assembly including a seat cushion and a seat back within a motor vehicle, said mechanism comprising:
    laterally spaced rail members;
    a carriage carried by said rail members for controlled longitudinal displacement, said seat assembly disposed upon said carriage; and
    means interconnecting said carriage and seat cushion operable to effect limited relative motion therebetween in response to an operator input, said motion comprising simultaneous vertical and longitudinal translation of said seat cushion between a fully extended, lowermost end limit of travel and a fully retracted, uppermost end limit of travel.

2. A split-frame power seat track mechanism for supporting and positioning a seat assembly including a seat cushion and a seat back within a motor vehicle, said mechanism comprising:
    laterally spaced rail members fixed to said vehicle;
    a carriage carried by said rail members for controlled longitudianl displacement, said seat cushion interconnected with said carriage through a front, lost motion pivot connection disposed intermediate a front edge of said seat cushion and a front underlying portion of said carriage and a rear fixed pivot connection disposed intermediate a rear edge of said seat cushion and a rear underlying portion of said carriage;
    first drive means operative to selectively longitudinally position said carriage in response to a first operator input;
    second drive means engaging said front pivot connection operative to selectively vertically position said front edge of said seat cushion in response to a second operator input; and
    third drive means engaging said rear pivot connection operative to selectively vertically displace said rear edge of said seat cushion in response to a third operator input, between fully raised and lowered end limits of travel and to simultaneously longitudinally displace said seat cushion with respect to said carriage between a fully retracted and extended end limits of travel.

3. The seat track mechanisms of claim 2, wherein said rear pivot connection is disposed substantially below a characteristic design H point of said seat assembly.

4. The seat track mechanism of claim 2, wherein said second drive means is operative to rotate said seat cushion about a horizontal axis disposed substantially below a characteristic design H point of said seat assembly.

5. The seat track mechanism of claim 2, wherein each said pivot connection comprises an elongated link member pivotally connected at space points thereon to said carriage and said seat cushion wherein on imaginary line drawn between said spaced points for each said link member is disposed generally horizontally when said cushion is in said fully lowered end limit and offset from horizontal by an acute angle when said seat cushion is in said fully raised end limit.

6. The seat track mechanism of claim 2, wherein said third drive mean is operative to longitudinally displace said seat cushion independently of said second drive means.

7. The seat track mechanism of claim 2, wherein said second and third drive means are simultaneously operable to effect vertical displacement of said seat cushion.

8. In combination:
a seat assembly including a seat cushion and a seat back; and
a split-frame power seat track mechanism for supporting and positioning said seat assembly within a motor vehicle, said mechanism comprising:
laterally spaced rail members fixed to said vehicle,
a carriage carried by said rail members for controlled longitudinal displacement, said seat cushion interconnected with said carriage through a front, lost motion pivot connection disposed intermediate a front edge of said seat cushion and a front underlying portion of said carriage and a rear fixed pivot connection disposed intermediate a rear edge of said seat cushion and a rear underlying portion of said carriage,
first drive means operative to selectively longitudinally position said carriage in response to a first operator input,
second drive means engaging said front pivot connection operative to selectively vertically position said front edge of said seat cushion in response to a second operator input, and
third drive means engaging said rear pivot connection operative to selectively vertically displace said rear edge of said seat cushion in response to a third operator input between fully raised and lowered end limits of travel and to simultaneously langitudinally displace said seat cushion with respect to said carriage between a fully retracted and extended end limits of travel.

* * * * *